Figure 1:
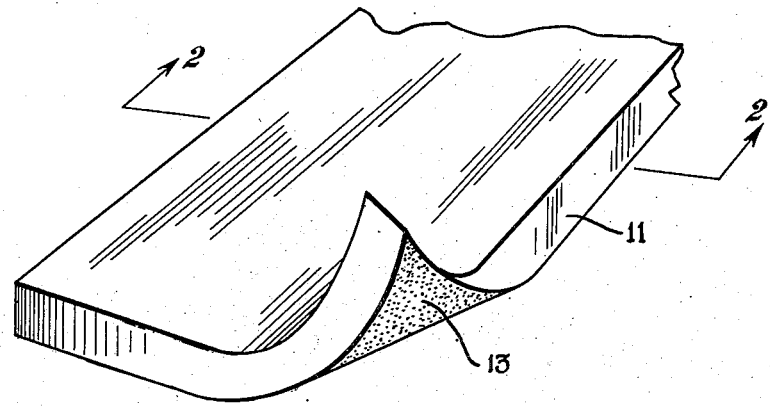

July 10, 1951  R. P. WHIPPLE  2,560,040

TIRE RETREADING AND REPAIR MATERIAL

Filed Jan. 21, 1949

INVENTOR.
Robert P. Whipple
BY

ATTORNEYS

Patented July 10, 1951

2,560,040

UNITED STATES PATENT OFFICE 2,560,040

TIRE RETREADING AND REPAIR MATERIALS

Robert P. Whipple, Akron, Ohio, assignor to The Firestone Tire & Rubber Company, Akron, Ohio, a corporation of Ohio Application January 21, 1949, Serial No. 71,861

4 Claims. (Cl. 117—138.8)

This invention relates to rubber repair materials or tire retreading strips such as camelback, essentially composed of GR-S as distinguished from natural rubber.

GR-S, as used herein, is a type of synthetic rubber which may be described broadly as a rubbery copolymer of a conjugated diolefin and a vinyl aromatic compound such as 1,3-butadiene and styrene, butadiene and alpha methylstyrene, butadiene and nuclearly chlorinated styrenes, and the like.

Tire retreading and rubber repair materials must necessarily have a surface of sufficient adhesiveness or tackiness to form a firm union (both during preparatory processing and after vulcanizing) with a tire body or other base. But good quality tread stocks being highly compounded with materials such as carbon black and zinc oxide, do not inherently have the requisite tackiness. This is true whether such a stock is composed of natural rubber or of GR-S. The former remedial practice involved laminating a calendered sheet of natural gum rubber on the face of retreading strips. The gum rubber provided the necessary tacky surface.

A process was developed, however, whereby a tacky surface could be attained on natural rubber retread strips or repair materials more directly and with the consequent elimination of the above described laminating step. This process is disclosed and claimed by Kempel in Patent No. 2,031,960, and provides generally for the treatment of a face of an element of rubber, to be used as repair or tire retreading material, with a stable terpene oil which is chiefly dipentene together with minor proportions of pinene, terpiene, terpinolene and cymene. These oils apparently form a solid solution with the rubber surface and in so doing the face thereof becomes highly tacky.

Though the Kempel process is very successful when used on repair elements composed of natural rubber, it was found to be entirely inapplicable when tried on GR-S materials. GR-S forms no solid solution with the terpene oils. It has, therefore, been necessary to continue the old expensive practice, aforementioned, of laminating a layer of natural gum rubber on the face of a GR-S element in order to provide a tacky surface thereon.

When it became evident that the Kempel process could not be utilized on GR-S as such, a natural solution of the problem seemed to be a combination of GR-S and natural rubber in a proportion or in proportions which would form a tacky surface with terpene oils. However, reasons exist which make such a solution impractical.

It is desirable that tire tread stock have a high degree of wear resistance. Such a quality is obtained by addition, in compounding, of reinforcing agents. A common example of such an agent is carbon black. But it has been found that natural rubber and GR-S containing reinforcing agents such as carbon black are relatively incompatible and form a very inferior product. Tread stock composed entirely of GR-S is less wear resistant than one composed of natural rubber. However, a tread stock composed of a mixture of GR-S and natural rubber is even less wear resistant by some twenty percent. Such a mixture is therefore commercially undesirable in tire treads.

An object, therefore, of this invention is to produce an essentially GR-S camelback which will have a tacky surface without the necessity of laminating a layer of celendered natural gum rubber upon the face thereof.

Another object of this invention is to produce an essentially GR-S camelback or rubber repair material, which will have a tacky surface, by an improved and cheaper method.

The foregoing and further objects are obtained in the manner illustrated in the accompanying drawing, in which—

Figure 2:
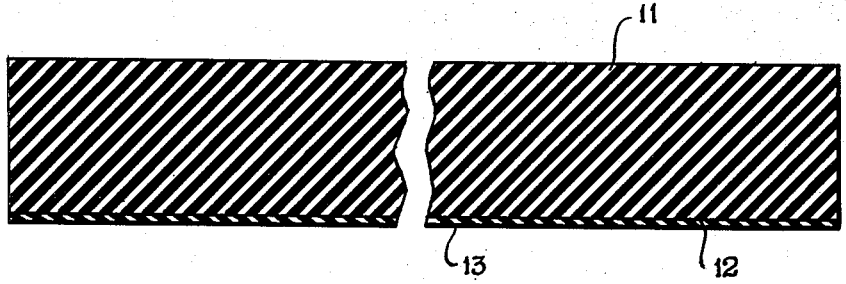

Figure 1 is a fragmentary view of a strip of camelback or rubber repair element essentially composed of GR-S which has a corner thereof turned up to show the tacky surface obtained by practicing the present invention; and Figure 2 is an enlarged sectional view taken on line 2,2 of Figure 1.

Similar numerals refer to similar parts throughout the several views.

Referring to the drawing, 11 is a rubbery strip composed essentially of vulcanizable GR-S, 12 is a face thereof, and 13 is a thin film of vulcanizable rubber hydrocarbon having incorporated therein a stable terpene oil.

At a suitable stage in the preparation of the strip 11, as when it is being extruded from the tubing machine and while it is still warm, the face 12 is coated as by spraying or painting with a solvent cement composed of vulcanizable rubber hydrocarbon and the ordinary compounding ingredients dissolved or dispersed in a rubber solvent, e. g. gasoline. The strip 11 is dried by suitable means, thus depositing on 12 a thin film of rubber hydrocarbon. This rubber hydrocarbon film is transformed into the terpene containing film 13 by coating (as by spraying, painting or dipping) with a stable terpene oil. The result is a GR-S camelback with a very tacky surface.

Major advantages of this invention are: simplicity of operation and reduced production costs. The process is adapted to use with machinery and equipment conventional in the rubber industry with only minor adjustments. Since under previous practice the laminated sheet of gum rubber was a calendered sheet, it had to be of sufficient thickness to permit the subsequent handling required to attach it on to the camelback element. As a practical matter the limit to reduction in thickness of such a calendered sheet is about 0.020 inch. The customary range is 0.025 to 0.031 inch. In contrast to the amount of gum rubber involved in carrying out such a laminating process, the film of gum rubber deposited from a rubber cement in practicing the present invention may be much thinner (0.002 to 0.007 inch). The saving represented thereby is substantial. In addition to reducing the amount of gum rubber used, the present invention also eliminates a manufacturing step requiring heavy machinery—that of calendering—with consequent production saying.

The invention is not limited to production of camelback alone but may be successfully practiced wherever one desires to produce articles essentially composed of vulcanizable GR-S which are to have surfaces adapted to adhering and vulcanizing to other rubbery surfaces, e. g. tube patching materials, rubber repair materials, and treads for new tires.

So too, natural rubber film may be deposited on GR-S surfaces from an aqueous rubber dispersion or cement rather than from a solvent cement. Other variations of the process as outlined naturally occurring to those skilled in the art are within the contemplation of this invention.

What is claimed is:

1. Camelback comprising a rubbery element essentially composed of a vulcanizable copolymer of 1,3-butadiene and styrene, and a thin film of vulcanizable natural rubber having incorporated therein a stable terpene oil, said film being deposited on and attached to a face of the element.

2. A rubber repair material comprising a rubbery element essentially composed of a vulcanizable copolymer of a conjugated diolefin and a styrene, and a thin film of vulcanizable natural rubber having incorporated therein a stable terpene oil, said film being deposited on and attached to a face of the element.

3. Camelback comprising a rubbery element essentially composed of a vulcanizable copolymer of 1,3-butadiene and styrene and a thin film of vulcanizable natural rubber having incorporated therein a stable terpene oil, said film being deposited from a natural rubber cement on and attached to a face of the element.

4. Camelback comprising a rubbery element essentially composed of a vulcanizable copolymer of a conjugated diolefin and a styrene, and a thin film of vulcanizable natural rubber having incorporated therein a stable terpene oil, said film being deposited on and attached to a face of the element.

ROBERT P. WHIPPLE.

REFERENCES CITED

The following references are of record in the file of this patent:

UNITED STATES PATENTS

| Number | Name | Date |
| --- | --- | --- |
| 2,031,960 | Kempel | Feb. 25, 1936 |
| 2,308,724 | Stamberger | Jan. 19, 1943 |
| 2,437,855 | Leach | Mar. 16, 1948 |
| 2,473,784 | Carlin et al. | June 21, 1949 |

OTHER REFERENCES du Pont's Blue Sheet BL–131, November 23, 1943, pages 1–3 by the Rubber Chem. Div. of the du Pont Co.